(12) United States Patent
Jones et al.

(10) Patent No.: US 7,770,188 B2
(45) Date of Patent: Aug. 3, 2010

(54) WINSOCK APIS

(75) Inventors: Anthony G. Jones, Kirkland, WA (US);
Gianluigi Nusca, Redmond, WA (US);
Khawar M. Zuberi, Bellevue, WA (US);
Noah Horton, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 11/407,499

(22) Filed: Apr. 20, 2006

(65) Prior Publication Data

US 2007/0261067 A1    Nov. 8, 2007

(51) Int. Cl.
G06F 3/00 (2006.01)
G06F 9/44 (2006.01)
G06F 9/46 (2006.01)
G06F 13/00 (2006.01)
G06F 7/00 (2006.01)
G06F 17/00 (2006.01)

(52) U.S. Cl. .................. 719/330; 707/613; 717/133; 719/318

(58) Field of Classification Search ................ 709/223, 709/238; 719/321
See application file for complete search history.

(56) References Cited

U.S. PATENT DOCUMENTS

| | | | |
|---|---|---|---|
| 6,061,743 A | 5/2000 | Thatcher et al. | |
| 6,256,031 B1 | 7/2001 | Meijer et al. | |
| 6,381,627 B1 | 4/2002 | Kwan et al. | |
| 6,546,415 B1 | 4/2003 | Park | |
| 6,553,377 B1 | 4/2003 | Eschelbeck et al. | |
| 6,604,148 B1 | 8/2003 | Dennison | |
| 6,687,701 B2 | 2/2004 | Karamanolis et al. | |
| 6,738,828 B1 | 5/2004 | Keats et al. | |
| 6,834,284 B2 | 12/2004 | Acker et al. | |
| 6,947,925 B2 | 9/2005 | Newcombe et al. | |
| 2001/0047407 A1* | 11/2001 | Moore et al. | 709/223 |
| 2004/0221059 A1* | 11/2004 | Bush | 709/238 |
| 2005/0039045 A1 | 2/2005 | Wheeler | |
| 2005/0076141 A1 | 4/2005 | Williams et al. | |
| 2006/0005010 A1 | 1/2006 | Olsen et al. | |
| 2006/0037028 A1* | 2/2006 | Adermann et al. | 719/321 |

OTHER PUBLICATIONS

Gorissen et al., "Integrating Grid Information Services Using JNDI," http://www.mathcs.emory.edu/dcl/h2o/papers/h2o-jndi-gridw05.pdf, Emory University, Atlanta, USA, 8 pages.

Sun Microsystems, Inc., "Java Naming and Directory Interface Application Programming Interface," http://java.sun.com/j2se/1.5/pdf/jndi.pdf, dated Jul. 14, 1999, 72 pages.

(Continued)

Primary Examiner—Hyung S Sough
Assistant Examiner—Tuan Dao
(74) Attorney, Agent, or Firm—Marshall, Gerstein & Borun LLP

(57) ABSTRACT

To improve upon existing Winsock implementations, the claimed system and method adapts an existing Winsock system to use out-of-process NSP services. The claimed method and system provides asynchronous Winsock Next calls to provide client application processing flexibility. Further, the claimed method and system provides additional structures for passing additional NSP specific information for a result set to enable further client functionality. One embodiment of the claimed system provides additional client Winsock API functions to aggregate and manage asynchronous calls to multiple NSPs and/or multiple namespaces.

20 Claims, 13 Drawing Sheets

OTHER PUBLICATIONS

Howell et al., "*Snowflake: Spanning Administrative Domains*," Technical Report PCS-TR98-343, Department of Computer Science, Dartmouth College, Hanover, Hew Hampshire 03755-3510, http://www.cs.dartmouth.edu/-dfk/papers/howell:snowflake2-tr.pdf, dated Dec. 9, 1998, 10 pages.

* cited by examiner

WINSOCK APIS

BACKGROUND

Operating systems may manage name space providers (NSPs) for a client application. Windows Sockets, in Microsoft Windows may be an example. Name space providers may provide an interface for interacting with a particular name space, such as a domain name system (DNS). Existing Winsock systems may require that third party name space providers provide an in-process component to interact with a Winsock component, such as a Winsock dynamic link library (DLL). This in-process dependency may present problems during runtime when third party components fail. For example, a failure of a third party component may cause a name service process and an associated client application to fail along with it.

Additionally, existing Winsock systems may not provide an efficient and client-friendly process for querying multiple NSPs and/or multiple namespaces for resolving a name space query. For example, an existing Winsock implementation may require a client application to manage a sequence of Begin, Next, End calls which, while providing a basic and universal method of NSP access, does not make client application programming efficient for querying multiple providers or name spaces. Also, existing Winsock systems may require synchronous communication with an NSP, which further hinders a client application from managing a plurality of NSP queries as well as limiting the client application's own processing capacity by requiring it to wait for Winsock calls to complete before performing any other processes.

Further, existing Winsock implementations may not provide an extensibility mechanism for NSPs to use. Thus, for example, when an NSP has additional information that it may provide, but may not be anticipated in an existing Winsock specification, existing Winsock implementations may not be able to propagate the information to a client application. This information may enable a client application to implement further functionality.

Still further, existing systems may only enable name resolution functions, which, e.g., allow for resolving name space queries, but do not allow for publication.

SUMMARY

The claimed method and system enables an existing Winsock system to handle out-of-process name space provider components. The claimed method and system also provides a set of asynchronous name space functions which may enable a client application to perform other processing during a name space query. The claimed method and system also provides an extensibility mechanism for communicating name space provider specific information and a client application programming interface that enables multiple NSPs, multiple name space queries, and publication.

DRAWINGS

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
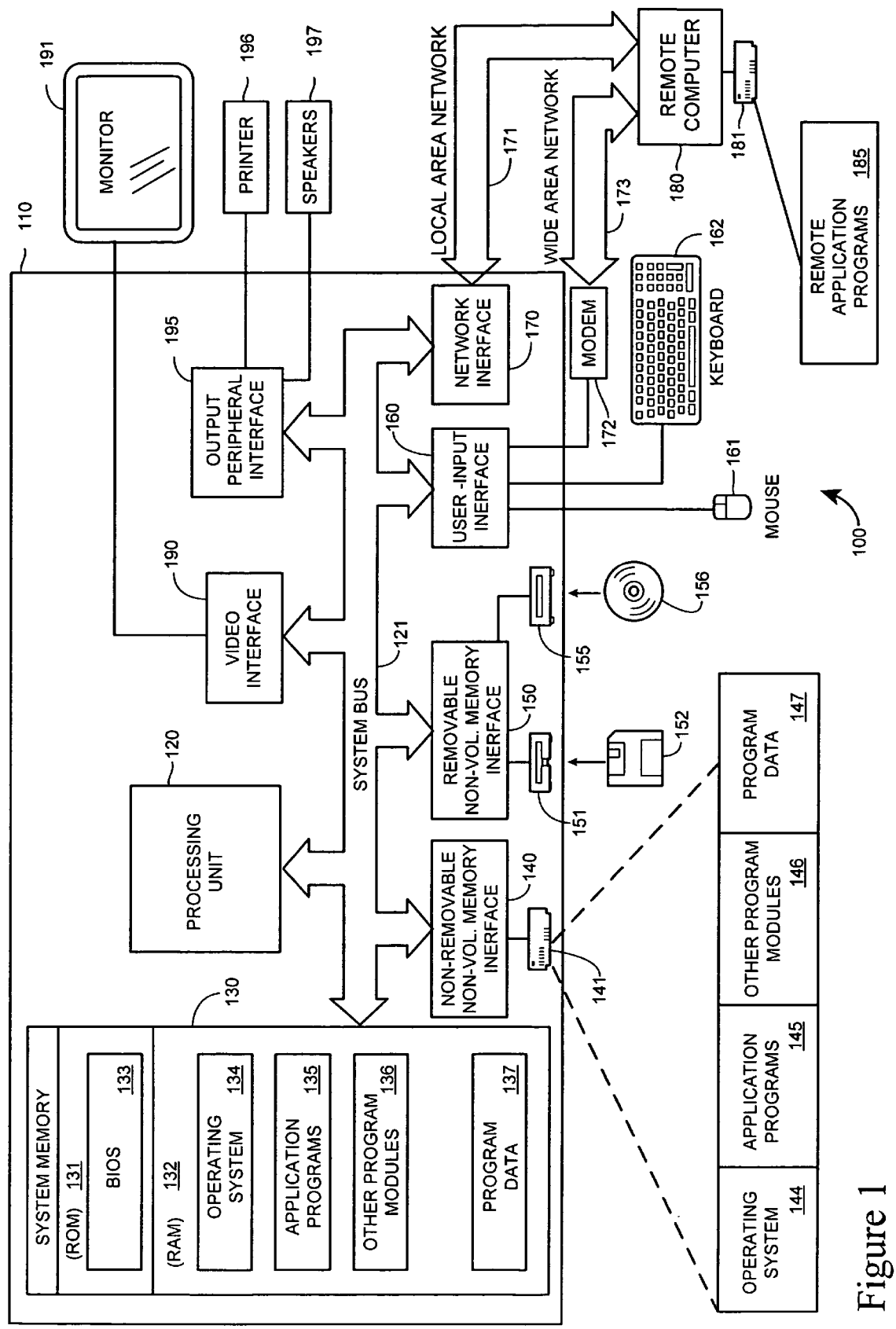
FIG. 1 illustrates a block diagram of a computing system that may operate in accordance with the claims.

FIG. 1 illustrates an example of a suitable computing system environment 100 on which a system for the blocks of the claimed method and apparatus may be implemented. The computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

The blocks of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The blocks of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (USA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media may be any available media that may be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components may either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interfaces and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It should be noted that the network connections illustrated are exemplary and other means of establishing a communications link between the computers may be used.

General Winsock

A name space may refer to a capability to associate (at a minimum) a protocol, addressing attribute(s), or object(s) of a network service with one or more stable names. A stable name may be a name that remains constant, even if its addressing attributes may change. A stable name may represent a human-friendly name. Many name spaces are currently in wide use including Domain Name System (DNS), the Peer Name Resolution Protocol (PNRP), the bindery and NetWare Directory Services (NDS), NIS, X.500, SAP, etc.

These name spaces may vary in how they are organized and implemented. For example, the Domain Name System (DNS) namespace is a tree of domains where host names and IP addresses are contained. Name resolution allows computers to use the DNS namespace to resolve host names to IP addresses and IP addresses to host names. Similarly, a directory namespace is a defined area where a network name (directory element) can be resolved into an object regardless of where it resides within the namespace. In the case of Active Directory, the namespace may be a forest and Active Directory provides name resolution services. A directory service may store information about resources on a network, including resolution information, and may make the information accessible to users and applications. The directory may be a physical database where information about the network may be stored.

A namespace provider (NSP) may provide an interface(s) to interact with a namespace, which may be performed, for example, through the directory service. The NSP may be a third party component.

Figure 2:
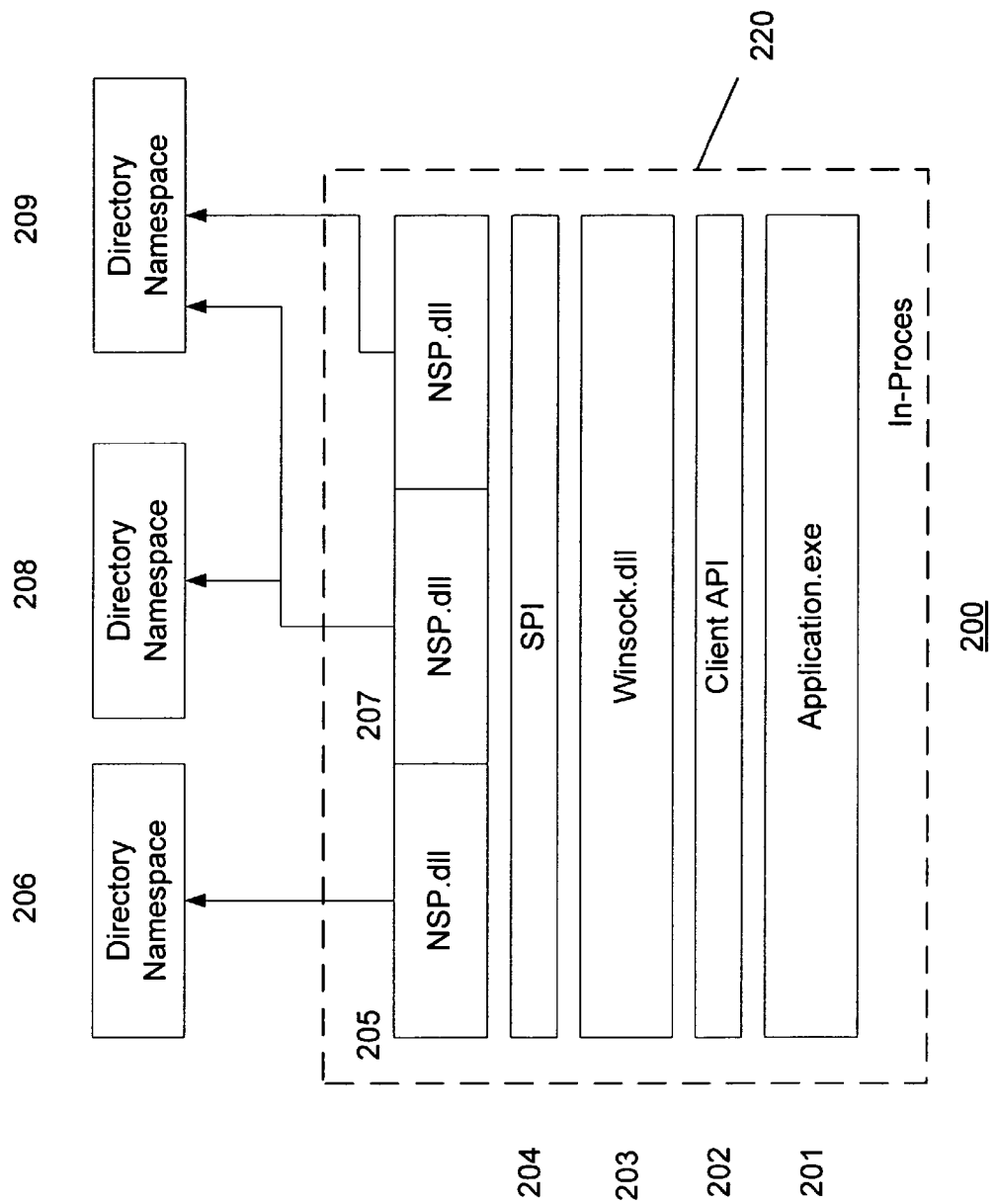
FIG. 2 illustrates a general Winsock system.

Winsock may be a component of an operating system that manages name service providers (NSPs) for a client application. FIG. 2 illustrates an architecture diagram for a general Winsock system 200. An application 201 may request resolution of a name or may request registration of a name in a specific name space. The application may access a Winsock component 203 via a Winsock application programming interface (API) 202. The Winsock component 203 may be connected to at least one name space provider (NSP) 205 via a name space service provider interface (SPI) 204, respectively. The NSP 205 may, in turn, connect with a namespace 206. A name space provider may be a locally-resident piece of software that knows how to map between a WinSock name space SPI and some existing name space (which could be implemented locally or be accessed via the network). The Winsock component may provide a number of different connection and query management functions for an application to interact with an NSP(s). An NSP 205 may enable communication with a single name space 206 or a plurality of name spaces 207, 209.

Existing Winsock systems may implement the NSP component as a dynamic link library (DLL) 205, illustrated as part of the in-process components of the system, using dashed line 220. Using an NSP DLL requires an application to import the DLL at runtime. This may be referred to as an in-process service. An application 201 that needs to obtain name resolution may be required to import the NSP DLL 205 at runtime along with the Winsock DLL 203. When a component is run as an in-process implementation 220, the client application 201 may be inextricably tied to its in-process parts. Because some existing Winsock implementations use in-process NSP components, NSP bugs or errors may cause failures to a Winsock system and its associated client application. For example, during a name space resolution call by a client application, if a third party NSP 205 provides faulty code, a failure at the NSP component may cause a failure to the client application 201. Furthermore, a service provider is granted access to all of an applications data in this model, preventing any security separation between application and NSP.

Out-of-Process, Asynchronous NSP Embodiment

Figure 3:
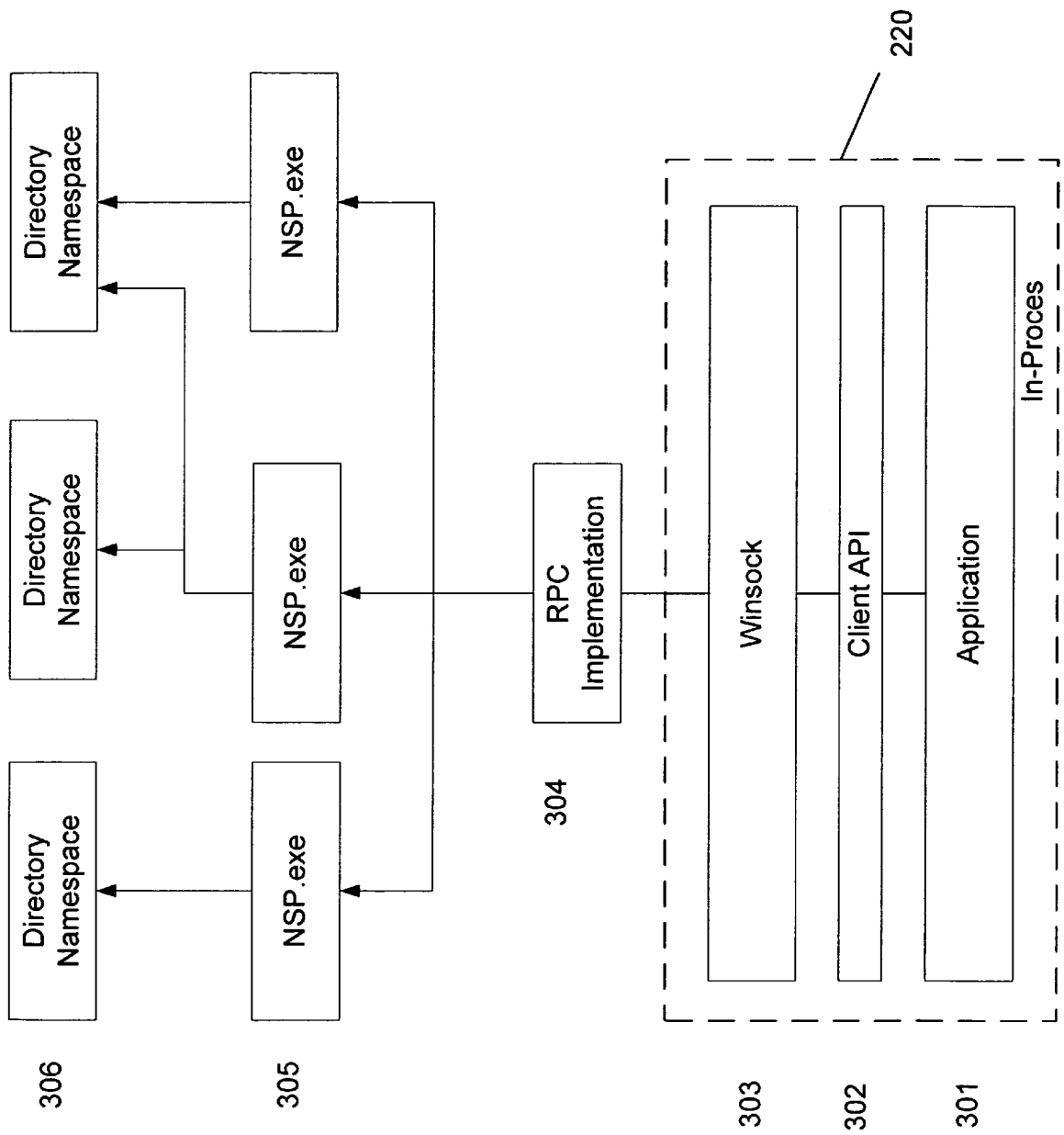
FIG. 3 illustrates an out-of-process NSP component embodiment.

FIG. 3 illustrates an embodiment of the claimed system. In this embodiment, the NSP 305 may be implemented as an out-of-process service. The service may be implemented as a running process, which may be activated by running a standard Windows executable (e.g., an .exe file). A remote procedure call (RPC) system may be used to enable communication between a client application 304 implementing a Winsock service 303 and the NSP component 305. In this case, the NSP may be considered an RPC endpoint. Alternately, any method of interprocess communication, such as shared memory, named pipes, sockets or the like could instead be used, though RPC is considered the best mode of operation.

Figure 4:
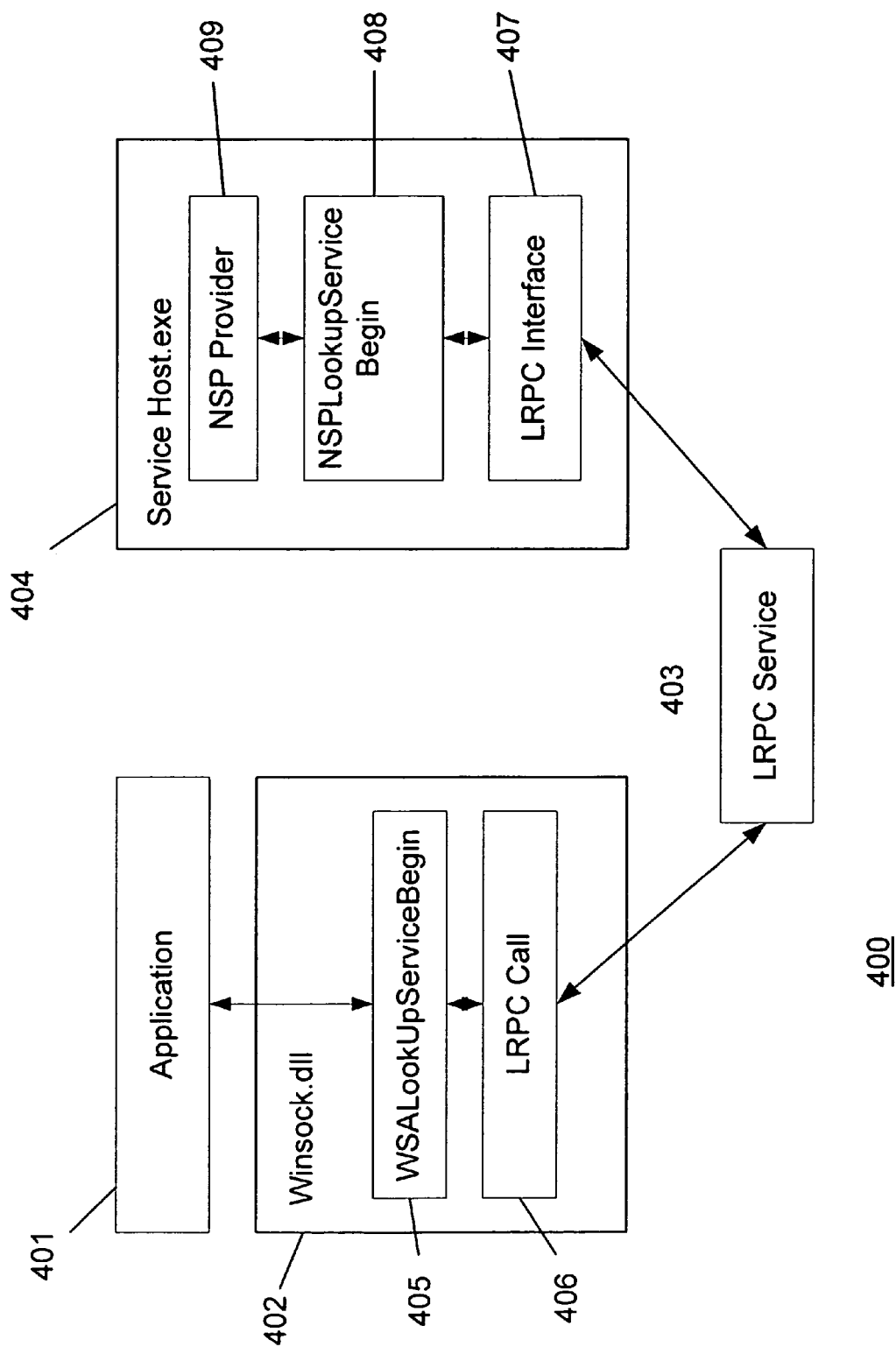
FIG. 4 illustrates an out-of-process NSP embodiment using LRPC.

FIG. 4 illustrates an embodiment in which a Lightweight Remote Procedure Call (LRPC) system 403, 406, 407 may be used to the provide the necessary RPC communication infrastructure between a client application 401 and an out-of-process NSP 409. In this embodiment, the application 401 may call a query function 405 of a Winsock 402 component, passing along any necessary parameters. The query function 405 may then invoke an LRPC call 406 which may be routed to an LRPC interface/endpoint 407 of an NSP 409 via an LRPC server/service 403. The name space provider 409 may receive the call via its LRPC interface/endpoint 407, process the request by initiating a interface call 408, and return a result by completing the LRPC call. The NSP may be invoked in an out-of-process service, such as a Win32 executable service host process, or SVCHost.exe 404.

The out of process NSP may use the LRPC to service client requests. Each provider may create an RPC endpoint using the LRPC protocol, or "ncalrpc," where the string endpoint parameter may be a string representation of the name space provider's GUID (the GUID under which the namespace provider was installed in a Winsock catalog). This mechanism may enable multiple namespace providers for the same namespace. While this embodiment illustrates the use of LRPC as an LPC implementation, it should be noted that COM and other LPC systems may also be used.

Per User Data Store Embodiment

In one embodiment, registration information may be maintained per logged-on user. In this case, the namespace provider may create multiple LRPC endpoints, or multiple instances of the provider may exist in different user contexts. There may be the general LRPC endpoint which consists of an NSP GUID and/or an LRPC endpoint for each user on the system (as there may be multiple users logged on with fast user switching). The format for the LRPC endpoints for each user may be <NSP GUIDString>_<User SID>. However, other formats may be available. In one embodiment a stable function may be used to map uniquely map an NSP GUID and user SID to an endpoint identifier. The stable function may have additional inputs such as a user session, where one user might be logged into a system multiple times.

When an application makes a query, Winsock may first attempt to connect to the user specific LRPC endpoint. If the LRPC connection to the user specific endpoint fails, Winsock may then, by default, connect to a general LRPC endpoint (e.g., the NSP GUID only).

Figure 5:
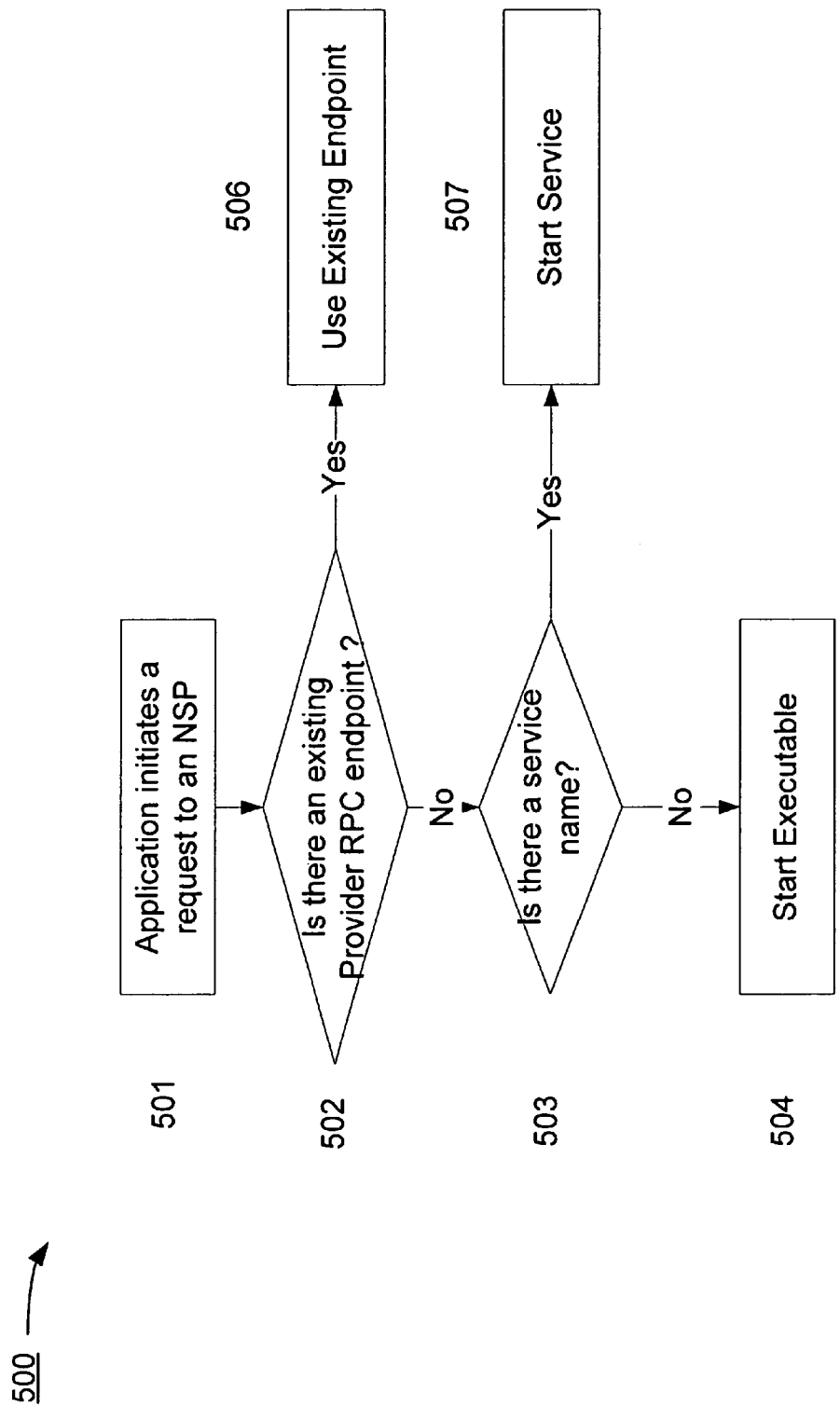
FIG. 5 illustrates an embodiment of a startup process for an out-of-process NSP system.

An embodiment of the out-of-process system may implement the general startup process 500 illustrated in FIG. 5. When an application sends a request for an NSP 501, a first check may be to determine whether the RPC endpoint for the given provider already exists 502. If the check succeeds, then the existing endpoint may be used to communicate with the NSP 506. If the check fails, then another check may determine if the NSP entry specifies sufficient information to initialize the provider process. For example, if the entry specifies a Windows service name 503, that service may be started by the Winsock API 507. If no service is specified, and the provider file name is an executable, then the executable may be started 504.

It may be desirable to stop the name service process after a period of inactivity. For some namespace providers, NSP queries may only occur when certain applications are started. When these applications exit, the service may need to be stopped as well since there may be a long period of inactivity until another query is made. Other NSPs, such as DNS, may be so frequently called that those NSPs may not need to be stopped as often. A namespace provider may determine its own instantiation and termination period to increase efficiency.

Asynchronous Query Calls

Figure 6:
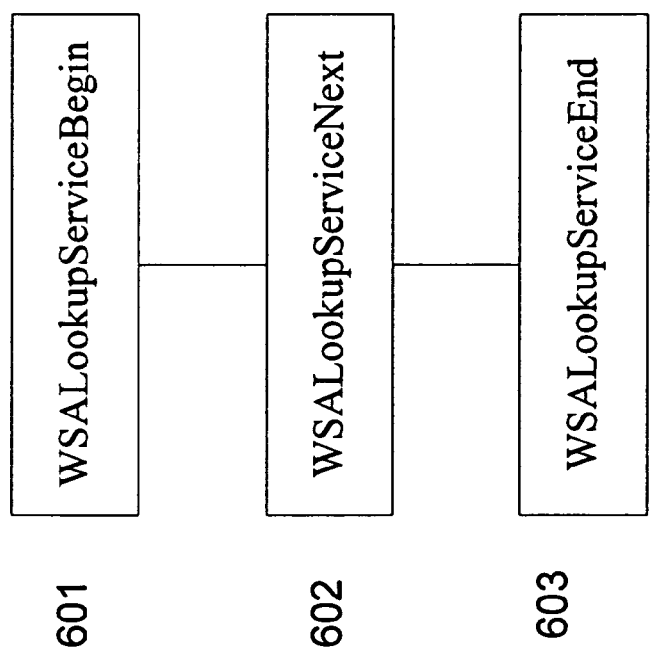
FIG. 6 illustrates a general query execution process using Winsock.

FIG. 6 illustrates a general query execution process using Winsock. A name space query to Winsock may involve a sequence of Winsock function calls. These function calls may include a Begin (WSALookupServiceBegin) call 601 to initiate a query, and a Next (WSALookupServiceNext) call 602 to enumerate a set of results or queries (via containers if supported), and an End (WSALookupServiceEnd) call 603 to release any provider context associated with the query. The application performing a namespace query may call Begin 601 and pass in a QuerySet (WSAQuerySet) structure that may define the query being performed.

Existing Winsock implementations using an in-process NSP may only provide synchronous function calls, which are functions that may tie up an application process until a return result may be obtained from a function call, thereby halting or blocking the application process. Each of the existing namespace functions may block for some period of time. When a query is initiated, a handle may be returned to describe the particular initiated query session. After obtaining a handle, a Next call may be initiated. Because a Next call may involve a significant amount of time, a synchronous Next call may inefficiently halt a client processing thread. This may mean that an application must await a response from the Winsock function before it may proceed to process other instructions. This may greatly delay response times for the application.

Figure 7:
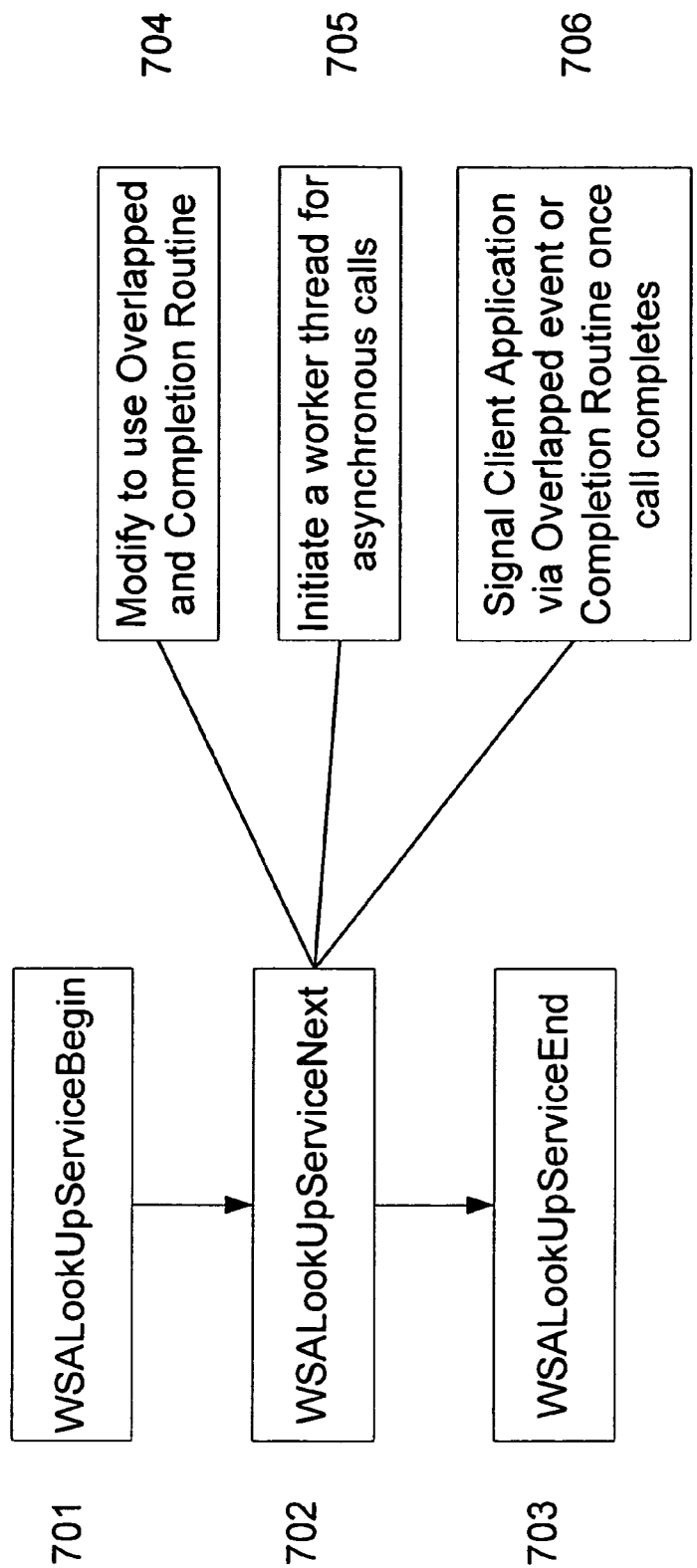
FIG. 7 illustrates modifications that may be made to an existing Winsock system to enable the Winsock system to function as an asynchronous, out-of-process system.

FIG. 7 illustrates modifications that may be made to an existing Winsock system to enable the Winsock system to function as an asynchronous, out-of-process system. The existing WSALookupServiceBegin (Begin) 701, WSALookupServiceNext (Next) 702, and WSALookupServiceEnd (End) 703 calls may continue to be implemented, but with modifications to their internal functionality.

The Begin 701 and End 702 functions may not need to be modified because their duration of operation may be short. A Begin function may simply create a query session state, save the query parameters, and return a query session handle (which may be associated with a call back function), without performing any operation that may block. Similarly, WSALookupServiceEnd may clean up any state without performing any operation that may block. The WSALookupServiceNext function 703 may be modified as illustrated in FIG. 7. The Next function may be modified to use additional parameters 704, called Overlapped, and/or a callback function (e.g., an asynchronous procedure call, or "APC"), called a Completion Routine. (It should be noted that Winsock and an out of process NSP may still support synchronous, or blocking, type calls in addition to the new functionality provided in the claimed embodiment, thereby providing backward compatibility.)

An existing WSALookUpServiceNext (Next) 602 may be extended using the following definition, called WSALookUpServiceNextEx (where the "Ex" suffix may designate a function extension) 702, where the additional parameters Overlapped and Completion Routine are italicized:

```
INT WSAAPI
WSALookupServiceNextExA(
    IN HANDLE      hLookup,
    _inout LPDWORD      lpdwControlFlags,
    _inout LPDWORD      lpdwBufferLength,
    _out_bcount(*lpdwBufferLength) LPWSAQUERYSET2A
    lpqsResults,
    IN LPWSAOVERLAPPED   lpOverlapped,
    IN LPLOOKUPSERVICE_COMPLETION_ROUTINE
        lpCompletionRoutine
);
```

The call back function Completion Routine may be defined as follows:

```
typedef
void
(CALLBACK * LPLOOKUPSERVICE_COMPLETION_ROUTINE)(
    IN DWORD          dwError,
    IN DWORD          dwBytes,
    LPWSAOVERLAPPED   lpOverlapped);
```

The Error parameter may indicate an error code if the callback fails. The Bytes parameter may indicate the number of byes returned. The Overlapped parameter may indicate an asynchronous context and refer to an associated Overlapped object. The Overlapped object may be a standard asynchronous overlapped structure that contains a pointer to a system event that may be triggered upon completion of an asynchronous call.

Because the query handles returned by the provider to describe a given query may not be true operating system handles, the query handles may not be associable with an input-output (IO) completion port. Instead Winsock may be modified to provide a method of associating a completion port handle with a client query session.

```
INT WSAAPI WSALookupServiceBindCompletion(
    HANDLE hLookup,
    HANDLE hIocp,
    ULONG_PTR Context
    );
```

The Lookup parameter may be a handle returned from a Begin function when setting up a query. The Iocp parameter may be a IO completion port handle. The context parameter may be a blob context representing a third party specific extension (to be discussed further below).

Registration of Names

WSASetService may be a function that registers or removes from a registry a service instance within one or more name spaces. WSASetService may be used to affect a specific name space provider, all providers associated with a specific name space, or all providers across all name spaces. In one embodiment, the following modified definition for WSASet-Service, called WSASetServiceEx, may be used to register an NSP (Additional parameters may be illustrated by the italicized portions of the function):

```
INT WSAAPI
WSASetServiceEx(
    IN LPWSAQUERYSET2A lpqsRegInfo,
    IN WSAESETSERVICEOP essoperation,
    IN DWORD dwControlFlags,
    IN LPWSAOVERLAPPED    lpOverlapped,
    IN LPLOOKUPSERVICE_COMPLETION_ROUTINE
    lpCompletionRoutine,
    OUT LPHANDLE lpSetHandle
    );
```

The Overlapped and Completion Routine are described previously. The SetHandle parameter may be a handle returned that references the set operation. A handle may be returned only if the WSASetServiceEx function is called asynchronously. The handle may be used in WSACancel-NameSpaceCall to cancel pending asynchronous operation.

After an operation has completed (either successfully or by calling a cancel routine), an additional WSASetServiceEnd function may be required to be called to free associated resources. WSASetServiceEnd may be defined as follows:

WSASetServiceEnd (IN HANDLE hSetHandle);

This routine may use a SetHandle returned from a previous call to WSASetServiceEx to free resources associated with the set operation. This routine may required to be called after an asynchronous WSASetServiceEx call completes.

In existing Winsock-NSP systems, only a single function may require multiple steps (i.e., WSALookupServiceBegin/Next/End). In the claimed asynchronous system, several functions may require a cleanup or end operation. In order to limit copying code, a common end routine, called WSANameSpaceCallEnd, may be implemented by other Winsock functions as needed to perform the clean up operation:

WSANameSpaceCallEnd (IN HANDLE hSetHandle);

Using a common end function provide function name consistency. For example, WSASetServiceEnd may be called to end a WSASetServiceEx call. This end routine may invoke the common routine WSANameSpaceCallEnd. By keeping the names similar, developers may be more likely to call the function correctly. Other multi-step functions like GetAddrInfoEx and SetAddrInfoEx (to be discussed below) may have similarly named end functions for consistency as well.

A WSACancelNameSpaceCall function may initiate a cancel of a previously posted asynchronous WSALookupServiceNextEx call. The calling application may still need to wait for completion notification before freeing the resources associated with the canceled asynchronous call. A WSACancelNameSpaceCall function may be as follows:

WSACancelNameSpaceCall(IN HANDLE hNspHandle);

Multiple NSP/Namespace Asynchronous Querying

Figure 8:
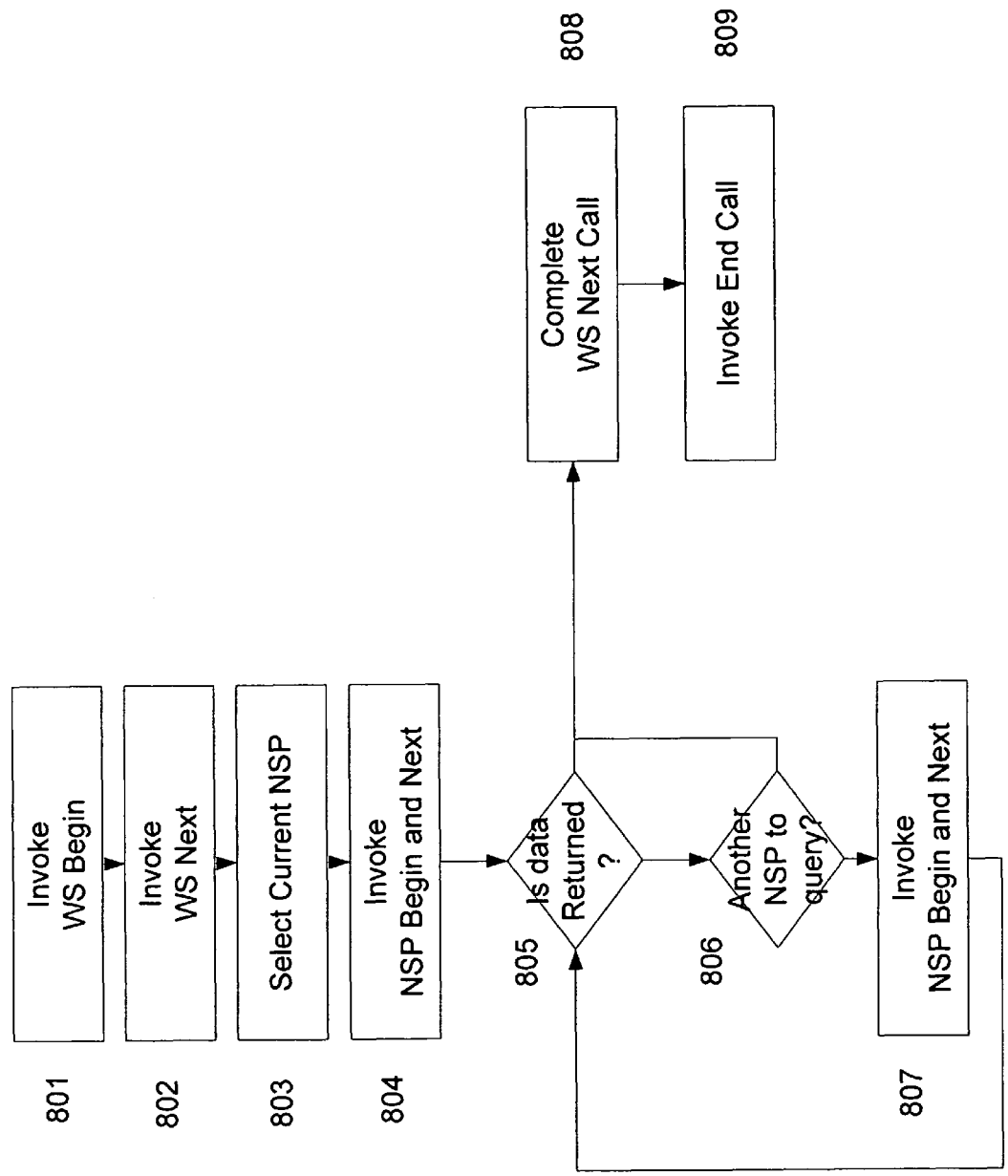
FIG. 8 illustrates a process in which an NSP query may span multiple providers.

FIG. 8 illustrates a process in which an NSP query 800 may span multiple providers, but a single call to WSALookupServiceNextEx 802 may result in calling only a single NSP. The process may start with a Begin call 801. Winsock may maintain the state of the query and a list of NSPs that may be queried. When an application invokes WSALookupServiceNextEx 802, the query state may indicate the current NSP to query 803 and invoke an NSP's NSPLookupServiceNextEx 804. Winsock may wait and determine if data is returned 805. If data is returned, then Winsock may complete the application's WSALookupServiceNextEx call 808, 809. However, if the NSP indicates no more data is available, Winsock may determine if there are any more NSPs to query 806. If there are other NSPs, Winsock may then call the next NSP's NSPLookupServiceNext function 807. This may continue until an NSP's NSPLookupServiceNext fails with a WSAENOMORE return indicating no more NSPs to query. At this point Winsock may return from its WSALookupServiceNext with a WSAENOMORE error to indicate the query has returned all results from the matching providers. The Next call may then be completed 808 and the End call closed 809.

Because a single call to a Winsock WSALookupServiceNext call may actually result in multiple calls to different NSPs, Winsock may not be able to use the application's asynchronous structures (e.g., WSAOVERLAPPED and Completion Routine) in the RPC call since a single NSP may return WSAENOMORE and Winsock may drop the overlap and completion routine when it queries the next NSP in the same application call. If this were not the case, when the first NSP indicated no more data, the application's call may complete itself and Winsock could not continue the query to other NSPs.

Figure 9:
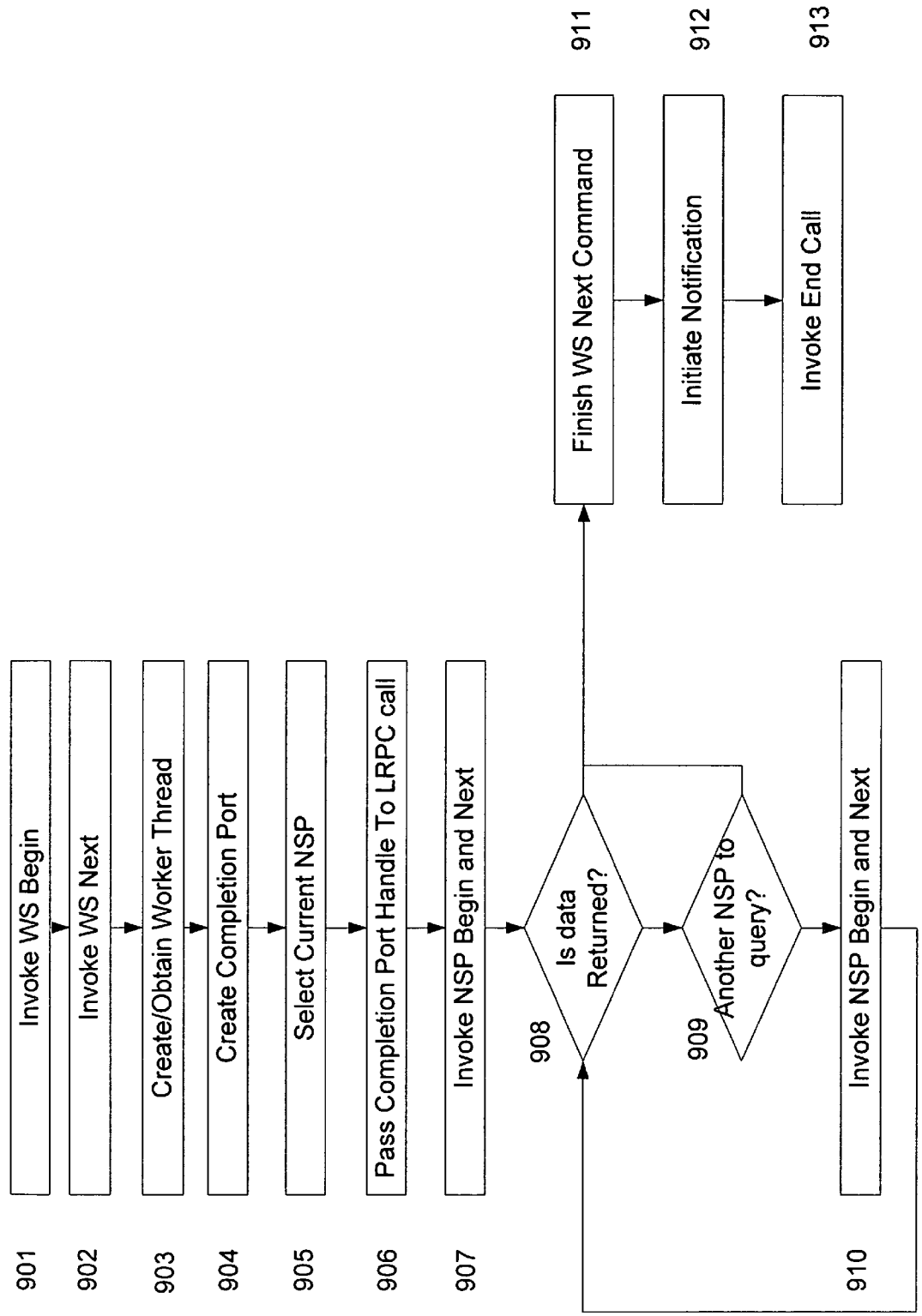
FIG. 9 illustrates an embodiment for supporting an asynchronous, multiple NSP call.

FIG. 9 illustrates an embodiment having additional blocks 903, 904, 906 for supporting an asynchronous, multiple NSP calls. In order to support asynchronous calls as well as timeouts to multiple NSPs, a worker thread may need to be provided 903 to wait for a call completion. The worker thread may create a completion port 904 whose handle may be passed with an associated LRPC call 906. Once an LRPC call completes, the worker thread may signal the client application via whatever method the application requested (overlapped event, completion routine, etc.) 912. These asynchronous enabling modifications are also illustrated by 705 and 706 in FIG. 7.

In a case where an application makes an asynchronous overlapped call with a non-zero timeout, the worker thread may wait on a result as long as the smallest timeout value of all outstanding operations. In the event the application posts another operation with a shorter timeout, Winsock may post an event to the completion port to adjust its minimum timeout value (e.g., the minimum timeout value may be adjusted up to the most current operation time out value). A completion port may offer better scalability than overlapped events or asynchronous procedure calls (APCs) such as Completion Routine.

Winsock DLL

Figure 10:
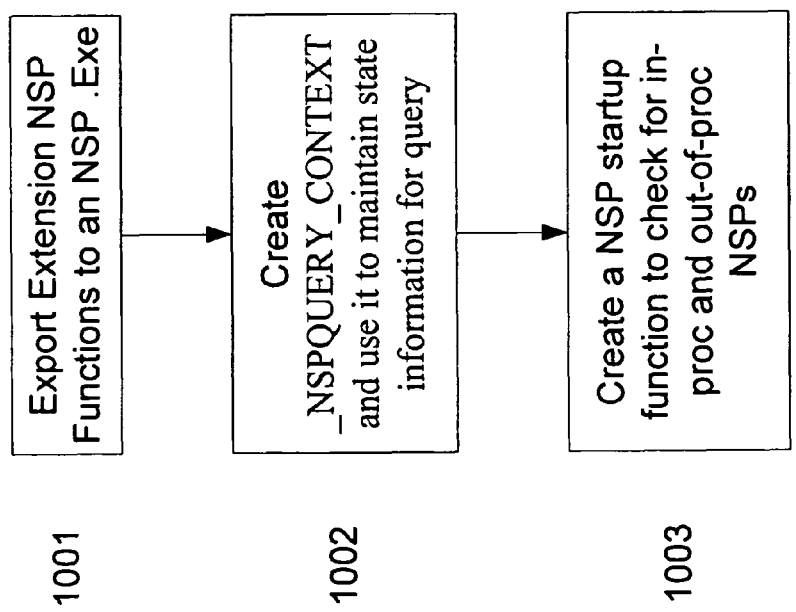
FIG. 10 illustrates modifications to an existing Winsock DLL.

FIG. 10 illustrates three modifications to an existing Winsock DLL that may enable a Winsock system to provide the out-of-process, asynchronous system described.

One change to an existing Winsock DLL may be to export NSP extension functions to an out-of-process component 1001, such as an executable.

A second change may be to adapt a Winsock DLL to maintain some state information for queries that associate a completion port handle on a query 1002. Because the query handle returned from any given NSP may not be unique, Winsock DLL may be required to generate a unique query handle that maps to an NSP returned query handle and an optional completion port. In this case Winsock DLL may use the following structure:

```
typedef struct _NSPQUERY_CONTEXT {
    HANDLE    hIocp;
    HANDLE    hNspQuery;
} NSPQUERY_CONTEXT;
```

This structure may contain the query handle returned from the NSP along with an associated IOCP handle. The address of this structure may then be returned to the application as a usable query handle. In this manner, when the application passes in the query handle, Winsock DLL may have the necessary context information to make and complete the call.

A third change may be to enable a Winsock DLL to determine whether the NSP to be called is an out-of-process server that may have to make an RPC call instead of calling a function pointer directly (as with an in-process DLL function) 1003. Additionally, if the RPC call fails because the service has not yet been started, the Winsock may be required to first start the service and make the call again.

Blob Data—NSP Extension

Existing Winsock systems may not provide an extensibility mechanism for NSP specific information. NSP specific information may be used to enable additional functionality within a client application. In one embodiment of the claims, modifications may be made to Winsock functions to propagate blob data, which may represent additional information associated with a query result that is provided by an NSP. Blob data may be provided by an NSP for a particular namespace where additional filtering of the results may be desired by the client, but requires additional information specific to the NSP, and which may not normally be provided by the regular query mechanism.

Figure 11:
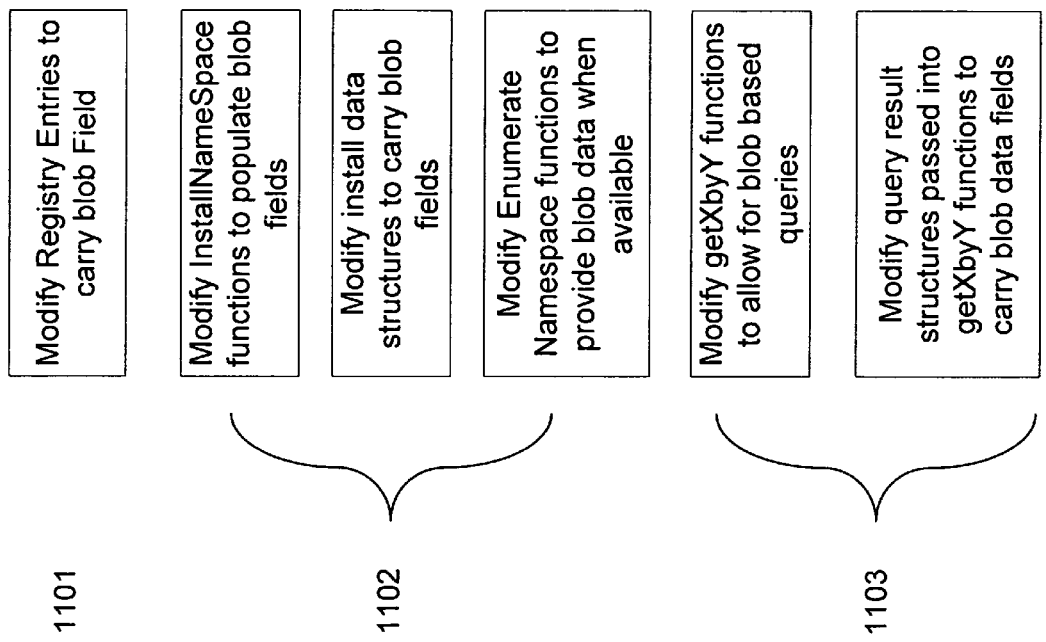
FIG. 11 illustrates modifications to an existing Winsock system that may enable NSP extension information.

FIG. 11 illustrates modifications to an existing Winsock system that may enable NSP extension information. To accommodate for NSP specific information in the Winsock system, the registry entries may need to be modified to hold an extra blob data field 1101. Accordingly, NSP installation functions may then need to be modified to install or remove blob data from the registry 1102. This may entail modifying an install name space function to process the blob parameter and modifying a install data structure to accommodate the extra blob parameter. NSP installation functions are described further below. Additionally, to enable clients to use the blob data, query functions and/or associated query structures may need to be modified to associate blob data with a result set 1103. This may entail modifying query structures such as the WSAQuerySet as described above, as well as modifying query functions such as any getXbyY functions (X and Y represent wildcard fields) or similarly, setXbyY functions. These modifications facilitate the marshaling of blob data between an NSP and a client to enable additional functionality based on the blob data.

An example of blob data may be information regarding the authority of an NSP over a name space, and hence over a result set for the namespace. An NSP may be authoritative or non-authoritative for a result set. An authoritative NSP for a namespace may mean that the NSP may provide a level of certainty or guarantee that the resolution results provided by the NSP are accurate. A non-authoritative NSP may not provide the guarantee. A non-authoritative NSP may be one that derives its result set from other indirect sources to a namespace.

Authoritative and non-authoritative result sets may be processed differently by a client application once the application is provided with this NSP specific information. Thus, the claimed embodiment provides a client the opportunity to handle resolutions differently based on whether they are from an authoritative or non-authoritative NSP. Furthermore, because the NSP may provide resolution for more than one namespace, the NSP may have different authority depending on the namespace. For example, an NSP that manages two names spaces may be authoritative for the first namespace and non-authoritative for the second name space.

An example of a name space that may have authoritative and non-authoritative resolutions, is the email name space. Because the email name space may be segmented into separate domains, their may be several name space providers providing duplicate or conflicting name resolutions. Depending on the association of an NSP to a name service directory, the NSP may be authoritative or non-authoritative for a domain. For example, multiple providers may use email names as identifiers for their namespaces, although they do not own the domain name in the DNS infrastructure for that part of the namespace. A first user may own the domain barneyrubble.net, and Microsoft Passport (and thus MSN Messenger) may let the first user register a messenger name barneyrubble@barneyrubble.net. However, Microsoft Passport may not monitor the name after it is registered. Thus, even if the domain barneyrubble.net is sold to another person the user may still use barneyrubble@barneyrubble.net in MSN messenger. Thus, MSN Messenger may by non-authoritative for the barneyrubble.net domain. Conversely, because Microsoft may own a domain such as hotmail.com, and may be authoritative for all email names@hotmail.com.

An NSP that is authoritative for a domain, or a namespace, may provide a guarantee or level of certainty that its results may trump any conflicting name resolution result. Thus, blob data may be used to help structure a request to an NSP or tag results from an NSP such that a client application may accordingly filter a result. Other NSP extension information may be supplied by the blob data.

NSP Registration

Registry entries may be managed using modified Winsock functions. Optional provider specific blob data may be saved in the registry location with the rest of the NSP information. In order to implement the additional blob data, a new registry key may be defined, for example, by adding a ProviderInfo key.

The following embodiment of a Winsock function may be used for installing an NSP with a provider specific blob (shown in italics):

```
INT WSCInstallNameSpaceEx(
    LPWSTR lpszIdentifier,
    LPWSTR lpszPathName,
    DWORD dwNameSpace,
    DWORD dwVersion,
    LPGUID lpProviderId,
    LPBLOB lpProviderInfo
);
```

The Identifier parameter may identify the NSP and the PathName may provide the location of the NSP component. The name space parameter may be used to designate the type of name space, for example a DNS name space may be designated using a parameter value of NS_DNS. The Version parameter may designate whether an NSP service/component is in-process or out-of-process. The Version parameter may indicate whether the NSP is a DLL or an executable. In one embodiment, backward compatibility may be enabled by using this parameter. The provider ID may be a designated GUID of the namespace. The blob parameter may provide third party NSP component specific data. The blob data may enable an NSP third party to register NSP specific or name space specific values to be used in communicating with the NSP component. In an embodiment, the WSAInstallNameSpaceEx may insert into a client system registry a listing of available NSPs and corresponding blob data specifying parameter and/or parameter value options when sending queries to the namespace. Thus, the blob parameter may provide extensibility in the NSP dialogue and interaction with Winsock. As discussed above, an example of blob data may be an indication of which name space the NSP may be authoritative for.

Because additional information may be associated with a provider entry, an updated namespace structure WSANAMESPACE_INFOEX may be created to contain an additional blob parameter accommodate the provider blob data (shown in italics):

```
typedef struct _WSANAMESPACE_INFOEX {
    GUID NSPProviderId;
    DWORD dwNameSpace;
    BOOL fActive;
    DWORD dwVersion;
    LPTSTR lpszIdentifier;
    LPBLOB lpProviderSpecific;
} WSANAMESPACE_INFOEX, *PWSANAMESPACE_INFOEX;
```

The general Winsock function WSAEnumNameSpaceProvidersEx may then be used with the new WSANAMESPACE_INFOEX structure to enumerate all providers along with their associated provider specific blob data:

```
WSAEnumNameSpaceProvidersEx(
    LPDWORD lpdwNspBufferLength,
    LPWSANAMESPACE_INFOEX lpNspBuffer,
);
```

Service Provider Interface (SPI)

Figure 12:
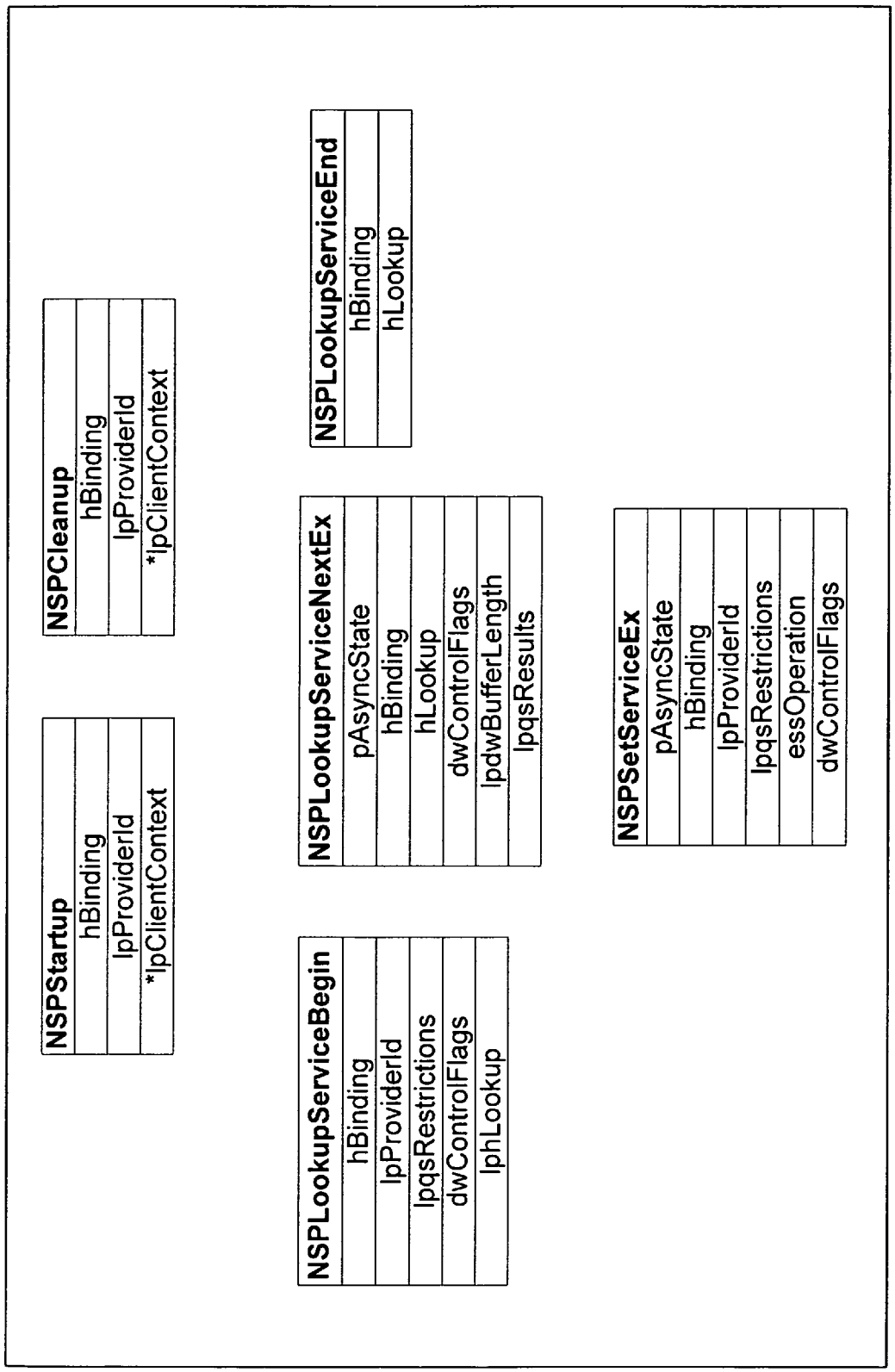
FIG. 12 illustrates a set of functions that a namespace provider may be required to implement to enable asynchronous, out of process service.

In an asynchronous, out-of-process embodiment, a name space provider (NSP) may be required to implement a service provider interface that includes a set of interface functions. In an embodiment requiring backward compatibility, an NSP may be required to continue to support previous existing interface functionality along with the functionality enabled by the claimed system. As previously discussed, the Winsock functions may be modified for an RPC implementation. Accordingly some NSP functions may need to be modified as well. The following may be function definitions that a namespace provider may be required to implement, as illustrated in FIG. 12, where italicized parameters may be modifications according to an embodiment of the system (it should be noted that the function names listed below may be modified slightly to differentiate them from previous function versions. For example, the NSPStartup below may be named NSPV2Startup to represent a newer function definition):

```
typedef
INT
NSPStartup(
    RPC_BINDING_HANDLE hBinding,
    LPGUID lpProviderId,
    LPVOID *lpClientContext
);
typedef
INT
NSPCleanup(
    RPC_BINDING_HANDLE hBinding,
    LPGUID lpProviderId,
    LPVOID lpClientContext
);
typedef
INT
NSPLookupServiceBegin(
    RPC_BINDING_HANDLE hBinding,
    LPGUID lpProviderId,
    LPWSAQUERYSET2W lpqsRestrictions,
    DWORD dwControlFlags,
    LPHANDLE lphLookup
);
```

```
typedef
INT
NSPLookupServiceNextEx(
    PRPC_ASYNC_STATE pAsyncState,
    RPC_BINDING_HANDLE hBinding,
    HANDLE hLookup,
    LPDWORD lpdwControlFlags,
    LPDWORD lpdwBufferLength,
    LPWSAQUERYSET2W lpqsResults
);
typedef
INT
NSPLookupServiceEnd(
    RPC_BINDING_HANDLE hBinding,
    HANDLE hLookup
);
typedef
INT
NSPSetServiceEx(
    PRPC_ASYNC_STATE pAsyncState,
    RPC_BINDING_HANDLE hBinding,
    LPGUID lpProviderId,
    LPWSAQUERYSET2W lpqsRegInfo,
    WSAESETSERVICEOP essOperation,
    DWORD dwControlFlags
);
```

In order to implement an RPC process, each of the NSP calls listed above may be required to implement a hBinding handle as a reference handle for an RPC call. hBinding may be a handle containing information that the RPC run-time library may need to access binding information. The lpClientContext parameter of the NSPStartup and NSPCleanUP functions may be a new RPC context handle returned by the RPC server. This handle may be important if the client process exits unexpectedly. In this event, the handle may be used to call an RPC rundown routine to direct the RPC server to clean up any context associated with the client.

The pAsyncState parameter used in NSP Next, End and SetService functions is used to pass a binding handle on an asynchronous remote procedure call. This handle may be passed when the Winsock Next call is asynchronous.

A namespace provider may simply need to compile against a public IDL file which contains the RPC interface definition and then provide an implementation of each function within the interface.

NSP providers may return RPC style error codes which may be translated, caught by the Winsock infrastructure, and set with WSASetLastError to enable a calling application to retrieve the error code.

In an alternative embodiment, the SPI may be modified to be an in-process component, in which case, RPC details may be shielded from the NSP. In this manner, there may be no need for to modify existing NSP functions.

Client API

The claimed out-of-process NSP, asynchronous Winsock system may be further modified at the client application programming interface (API) level to provide a client application new functionality. An extension of the GetAddrInfo function, called GetAddrInfoEx may initiate a series of WSALookUpServiceBegin, WSALookUpServiceNext, and WSALookUpServiceEnd sequence calls of the Winsock service to perform multiple name resolution queries on a single NSP as well as multiple name resolution queries over a plurality of NSPs. This function may be used to query for an address in a namespace and aggregate query results returned from one or more NSP components. In one embodiment an NSP identifier parameter (e.g., NS_DNS, NS_ALL, etc.), a namespace parameter, an overlapped parameter, and/or a completion routine parameter may be used to enable further client functionality.

An embodiment of the function may be as follows (where modifications may be shown italicized):

```
GetAddrInfoEx(
    PCSTR               pNodeName,
    PCSTR               pServiceName,
    DWORD               dwNameSpace,
    LPGUID              lpNspId,
    struct addrinfoex   hints,
    struct addrinfoex   lpResults,
    struct timeval      timeout,
    LPOVERLAPPED        lpOverlapped,
    LPLOOKUPSERVICE_COMPLETION_ROUTINE
                        lpCompletionRoutine,
    OUT LPHANDLE        lpNameHandle
);
```

The name being queried may be designated using pNodeName.

An optional service string being queried (e.g. port) may be designated using pServiceName.

Optional flags that may be passed to the underlying query (e.g. flags defined for WSALookupServiceBegin) may be designated using dwFlags. Additionally, a new flag called LUP_NON_AUTHORITATIVE, may be used to indicate to the NSP(s) that all addresses, including those from a non-authoritative source may be returned. In one embodiment, any addresses returned from the NSP which are not marked as authoritative may not be aggregated into the data returned to the application. Similarly, a flag such as LUP_SECURE may be specified to restrict the results to secure registrations.

An optional namespace identifier such as NS_DNS, NS_ALL, etc., may be designated using dwNameSpace. Specifying NS_ALL may result in all installed (and active) namespaces being queried. Passing a specific namespace ID may result in only that namespace being queried.

An optional GUID of a specific NSP to query (in the event there are multiple providers registered under a single namespace number) may be designated by lpNSPId.

Hints may be an optional addrinfo structure which is also used to pass additional flags to further clarify the name resolution request. Additional ai_flags values may be defined that may correspond to flags to be passed to the underlying WSALookupServiceBegin call. For example, If the AI_NON_AUTHORITATIVE is passed as a hint in the ai_flags, then the query may include non-authoritative responses.

A linked list of addrinfoex structures that may be returned upon successful completion of a call may be designated using lpResults. The addrinfoex structure may be used in this function for consistency since a base GetAddrInfo function may use it. The addrinfoex structure may also provide a way of returning canonical names, socket type and protocol information. Also, the ai_flags field for each address may contain a new flag (AI_NON_AUTHORITATIVE) if the address indicates that it comes from a non-authoritative name provider. In one embodiment, if the application passes LUP_NON_AUTHORITATIVE then no non-authoritative results may be returned. It may be necessary to set this flag on each address returned because a single call to GetAddrInfoEx may result in multiple resolution requests from one or more providers and the entire set of addresses may then contain both authoritative and non-authoritative addresses.

The timeout parameter may be an optional parameter specifying how long to wait for a result from the NSP. Passing NULL may direct a Winsock function to wait until the call completes. An asynchronous call using an overlapped structure may use a timeout parameter. For example, if the timeout occurs before the overlapped call may be completed, the call may be canceled and completed with an error (WSAETIMEOUT). The timeout parameter may be a "struct timeval" structure that may contain a seconds and a microseconds field.

The lpOverlapped parameter may be an optional WSAOVERLAPPED context structure required when making an asynchronous call (as described previously).

The lpCompletionRoutine parameter may be an optional function, which, when called asynchronously, may be invoked upon successful completion of the call (as described previously).

The lpNameHandle parameter may be used only for asynchronous calls (and may be required to be present if making an asynchronous call). GetAddrInfo may returns this handle value that describes an operation posted. When the operation completes, the application may be required to call AddrInfoEnd to free associated resources. While the call is pending, an application may cancel the call by using AddrInfoCancel.

Figure 13:
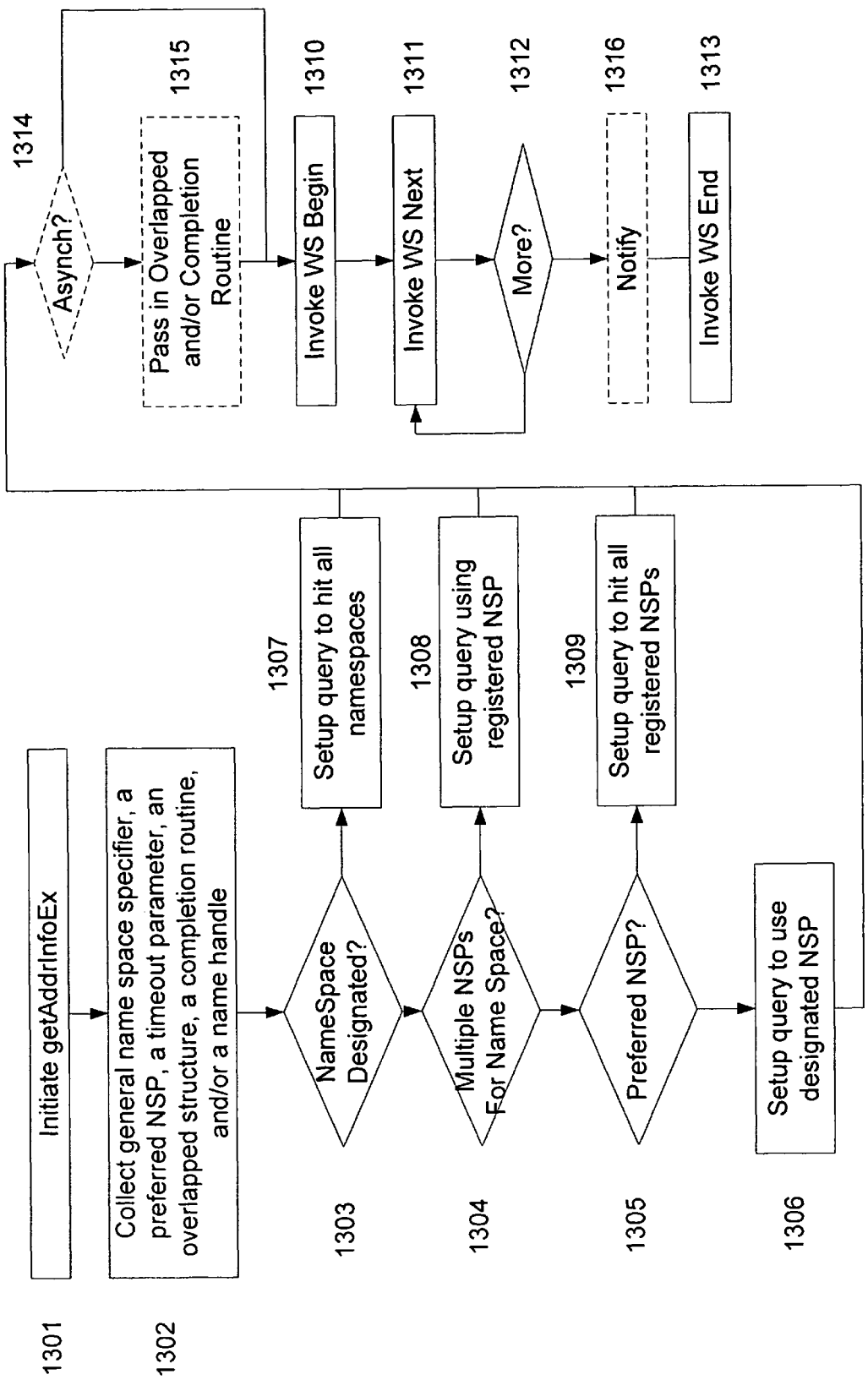
FIG. 13 illustrates a modified GetAddrInfo process call called GetAddrInfoEx.

FIG. 13 illustrates a general GetAddrInfoEx process call. When a GetAddrInfoEx call is made 1301, additional parameters such as the general name space, the preferred NSP, the timeout parameter, the overlapped structure, the completion routine, and/or the name handle may be collected 1302. The GetAddrInfoEx may then determine whether a name space has been designated 1303. If not, then a query may be set up to hit all registered namespaces 1307 and invoke a sequence of Winsock (WS) Begin 1310, Next 1311, End 1313 calls. This sequence may involve multiple Next calls to iterate through the multiple NSPs for the multiple namespaces 1312. If a name space is designated, it may be determined whether there is more than one NSP registered for the namespace 1304. If there is only one, a query may be setup to query the single registered NSP 1308 and a sequence of WS Begin 1310, Next 1311, End calls may be invoked 1313. If there are multiple NSPs, it may be determined whether there is a preferred NSP designated 1305. If there is a preferred NSP, then a query may be setup to hit that preferred NSP 1306. Otherwise, a query may be setup to hit all registered NSPs for the namespace 1309. In either case, a WS Begin 1310, Next 1312, and End 1313 sequence may be invoked to carry out the query.

In asynchronous embodiment, additional processing 1314-1316 may be implemented. A check to determine if a call is asynchronous may be made 1314. If it is not asynchronous, then the synchronous processing 1310, 1311, 1312, and 1313 may be used. If it is synchronous then an Overlapped and/or Completion Routine may be passed in to the Begin, Next, End calls. Additionally, the Next call may use the NextEx call as described above. After the NextEx call completes, a notification event 1316 may be initiated before the Winsock call End. The Notify event may invoke a system event that may be defined by the Overlapped structure, or an asynchronous procedure call (APC) to the Completion Routine.

The data returned from GetAddrInfoEx may be returned in an ADDRINFOEX structure. This structure contains extra information relevant to the information returned. As GetAddrInfoEx may aggregate information returned form multiple calls to an NSP as well as multiple NSPs themselves, extra information may be passed back so that the application does not need to perform the low level query (WSALookupServiceBegin/Next/End) itself.

```
typedef struct ADDRINFOEX
{
    int     ai_flags;       // AI_PASSIVE, etc.
    int     ai_family;      // PF_xxx
    int     ai_socktype;    // SOCK_xxx
    int     ai_protocol;    // 0 or IPPROTO_xxx
    size_t  ai_addrlen;     // Length of ai_addr
    TCHAR   *ai_canonname;  // Canonical name for nodename
    struct sockaddr *ai_addr; // Binary address
    void    *ai_blob;
    size_t  ai_bloblength;
    LPGUID  ai_provider;
    struct addrinfoex *ai_next;  // Next structure in linked list
} ADDRINFOEX, *PADDRINFOEX, *LPADDRINFOEX;
```

The extra fields may be the blob data parameters (ai_blob and ai_bloblength) and the provider ID. The blob data may be used to return provider specific information that may be associated with the name beyond just a list of addresses. The provider ID may be a GUID of the namespace which may have provided the result. This may be used by the application to prefer one set of results over another. Additionally, two query flags used by WSALookupServiceBegin/Next/End (LUP—NON_AUTHORITATIVE and LUP—SECURE) may be propagated in the ADDRINFOEX structure in the ai_flags field upon return. If these flags are set in the results returned by the NSP, GetAddrInfoEx may set these values in the ADDRINFOEX structure associated with the returned addresses. For consistency, these flags may be mapped to AI_NON_AUTHORITATIVE and AI_SECURE (but have the same underlying defined value).

In addition to authoritative and non-authoritative NSPs for a name space, an NSP may provide a secure versus non-secure result. This may be implemented to distinguish namespaces that provide a security mechanism to prevent tampering with namespace mappings, versus namespaces that do not provide a security mechanism. An example of a secure name space may be peer name resolution protocol (PNRP) which may require a security mechanism for each resource member (node) on the name service.

Additionally, a setAddrInfoEx function may be used to register a name and address with a name space. This may be used if the NSP and/or name space allows for this functionality. Some name spaces may only allow insertion through a secure mechanism not provided by Winsock. In an embodiment, the following definition may be used for setAddrInfoEx:

```
int WSAAPI
    SetAddrInfoEx(
    PCSTR                       pName,
    PCSTR                       pServiceName,
    SOCKET_ADDRESS              *pAddresses,
    DWORD                       dwAddressCount,
    _in_opt LPBLOB              lpBlob,
    DWORD                       dwFlags,
    DWORD                       dwNameSpace,
    LPGUID                      lpNspId,
    Struct timeval              timeout,
    LPOVERLAPPED                lpOverlapped,
    LPLOOKUPSERVICE_COMPLETION_ROUTINE
    lpCompletionRoutine,
    OUT LPHANDLE                lpNameHandle
    );
```

A name being registered may be designated by pName.

A service associated with the name being registered may be designated by pServiceName.

An array of addresses to be associated with pName may be designated by pAddresses. SetAddrInfoEx may use SOCKET_ADDRESS structures over addrinfo structures for ease of use and simplicity. Requiring an application to allocate a linked list of addrinfo structures which then may contain pointers to address structures may be cumbersome and may require writing macros to manipulate the structures (similar to the WSACMSG macros for WSASendMsg and WSARecvMsg). Additionally, the many flags and fields of the addrinfo structure may be unused for registration and may require extra parameter validation complexity if some of them were used. Any additional information that the provider may need may be passed as a part of the blob data parameter in a provider defined structure (instead of Winsock imposing a particular structure which may or may not fit the needs of the provider).

It should be noted that while SetAddrInfoEx may use SOCKET_ADDRESS structures, if future name space implementations require an association of socket type or protocol with an address, the API specification may be modified to include this information.

The dwAddressCount parameter may be the number of addresses in the array. If the address count is zero, the service name may be deregistered from the given namespace(s).

The lpBlob parameter may be an optional blob information to register (such as persistence).

The dwFlags parameter may represent optional flags which are passed to the WSASetService call.

The dwNameSpace parameter may be an optional namespace number to register information with (e.g. NS_DNS).

The lpNspId parameter may be an optional GUID of a specific namespace query (in the event there are multiple providers registered under a single namespace number).

The timeout parameter may be an optional parameter specifying how long to wait for a result from the NSP.

Preferred Names Flag

Preferred names may be the notion that a given user has several identities which can be used to describe him or herself. In this instance, an application may want to query the available NSPs for available names—not addresses. In this case, an extra flag may be created and passed to the WSA-LookupServiceBegin call which may define a query as a preferred name lookup.

define LUP_RETURN_PREFERRED_NAMES 0x10000

When an application invokes a query with LUP_RETURN_PREFERRED_NAMES, those NSPs queries which may not support this type of query may simply return an appropriate error (WSAEOPNOTSUPP). Those that may support the query may return a list of preferred names in a predefined blob structure, for example:

```
typedef struct _WSAPREFERREDNAMES {
    WCHAR   *lpszPreferredNameList;
} WSAPREFERREDNAMES;
```

The lpPreferredNameList may be a series of NULL terminated strings with the entire list being NULL terminated as well (i.e. each string is NULL terminated and the last string in the list has two consecutive NULL characters).

The invention claimed is:

1. A computer implemented method of aggregating a name service resolution result using an asynchronous Winsock call, the method comprising:
collecting a namespace parameter, an overlapped structure parameter, a completion routine parameter and a name handle from a client application;
initiating a Begin call of a Winsock client application program interface (API);
initiating an asynchronous Next call of the Winsock client API based on the namespace parameter, wherein the Next call is directed to make a query to a name space provider registered for a namespace corresponding to the general namespace parameter;
determining if a completion routine parameter provides a user defined asynchronous procedure call; and
executing the user defined asynchronous procedure call when the Next call is completed if the user defined asynchronous procedure call exists, otherwise, executing a system event based on the overlapped structure parameter when the Next call is completed.

2. The method of claim 1, further comprising initiating a plurality of Winsock client API Next calls when a number of namespace providers (NSPs) are registered for a namespace identified by the general namespace parameter.

3. The method of claim 1, further comprising collecting a preferred namespace identifier parameter and initiating a Next call that queries the specific name space provider identified by the preferred namespace identifier when more than one namespace provider is registered for the namespace identified by the general namespace parameter.

4. The method of claim 1, further comprising collecting a timeout parameter and waiting a duration indicated by the timeout parameter for a query result to be returned from an NSP.

5. The method of claim 1, further comprising using the name handle to perform one of freeing resources associated with the query upon completion of the query and canceling a pending query call.

6. The method of claim 1, wherein the general namespace parameter includes one of an indication of a single registered namespace and an indication of all registered namespaces.

7. The method of claim 1, further comprising collecting an authoritative flag parameter and initiating a Next call that constructs a query to return one of an authoritative and non-authoritative result based on the authoritative flag parameter.

8. The method of claim 1, further comprising collecting a security flag parameter and wherein initiating a Next call comprises constructing a query to return one of a secure and non-secure result based on the security flag parameter.

9. The method of claim 1, further comprising returning a name service resolution result in a data structure including a namespace provider identifier for identifying the namespace provider that provided the result for the data structure.

10. The method of claim 9, wherein the data structure includes an authoritative flag parameter that indicates whether the result contained by the data structure was produced by an NSP that was authoritative for a namespace of the result.

11. The method of claim 9, wherein the data structure includes a blob field that provides information associated with the resolution result that is specific to a name space provider.

12. A computer-storage medium having computer-executable instructions for performing operations comprising:
collecting a set of parameters from a client application including a general namespace parameter, an overlapped structure parameter, and an authoritative flag parameter;
constructing a query set structure that includes the collected parameters;
initiating a Begin call of a Winsock client application programming interface (API) by passing in the query set structure;
initiating a plurality of asynchronous Next calls of the Winsock client API to query a plurality of name service providers registered for a namespace identified by the general namespace parameter;
determining if a completion routine parameter provides a user defined asynchronous procedure call,
executing the user defined asynchronous procedure call when the Next call is completed if the completion routine parameter provides a user defined asynchronous procedure call, otherwise, executing an event based on the overlapped structure parameter when the call is completed.

13. The computer-storage medium of claim 12, further comprising initiating a plurality of the Next calls of the Winsock client API to query a plurality of name services if the general namespace parameter designates ALL.

14. The computer-storage medium of claim 12, wherein initiating a plurality of the Next calls comprises initiating a first asynchronous Next call to query namespace provider (NSP) for all results that the NSP is authoritative for and initiating a second asynchronous Next call to query the NSP for all addresses that the NSP is not authoritative for.

15. The computer-storage medium of claim 12, further comprising storing a data structure that includes one of an authoritative flag parameter, a blob parameter, a namespace provider identifier, and the results of the query.

16. A computer system comprising:
a processor;
a memory having computer executable instructions; which, when executed, cause the processor to execute the steps of:
collecting a namespace parameter, an overlapped structure parameter, a completion routine parameter and a name handle from a client application;
initiating a Begin call of a Winsock client application program interface (API);

initiating an asynchronous Next call of the Winsock client API based on the namespace parameter, wherein the Next call is directed to make a query to a name space provider registered for a namespace corresponding to the general namespace parameter;

determining if a completion routine parameter provides a user defined asynchronous procedure call; and executing the user defined asynchronous procedure call when the Next call is completed if the user defined asynchronous procedure call exists, otherwise, executing a system event based on the overlapped structure parameter when the Next call is completed.

17. The system of claim 16, further comprising computer executable instructions that cause the processor to:

execute a client application programming interface (API) for the Winsock component comprising a Begin call, an asynchronous Next call, and End function, and a get address information function wherein the get address information function initiates at least one sequence of the Begin calls, the Next calls, and the End calls to perform multiple name resolution queries on a single namespace provider (NSP) and multiple name resolution queries over a plurality of NSPs, wherein the multiple name resolution queries on a single NSP comprise querying for resolution results for a plurality of name spaces managed by the NSP.

18. The system of claim 17, wherein the multiple name resolution queries over a plurality of NSPs occurs when a general namespace parameter of the get address information function indicates that a namespace is serviced by multiple registered NSPs.

19. The system of claim 17, wherein the get address information function further initiates a series of the Begin calls, the Next calls, and the End calls to perform multiple name resolution queries over a plurality of namespaces.

20. The system of claim 17, further comprising an address information structure that is used to contain the results of the get address information function, wherein the address information structure includes one of an authoritative flag parameter, a blob parameter, a namespace provider identifier, and a query result.

* * * * *